June 20, 1933.   S. B. WINN   1,915,142
LEG ELEVATING MEANS FOR TRAILERS
Filed Dec. 22, 1930    3 Sheets-Sheet 3
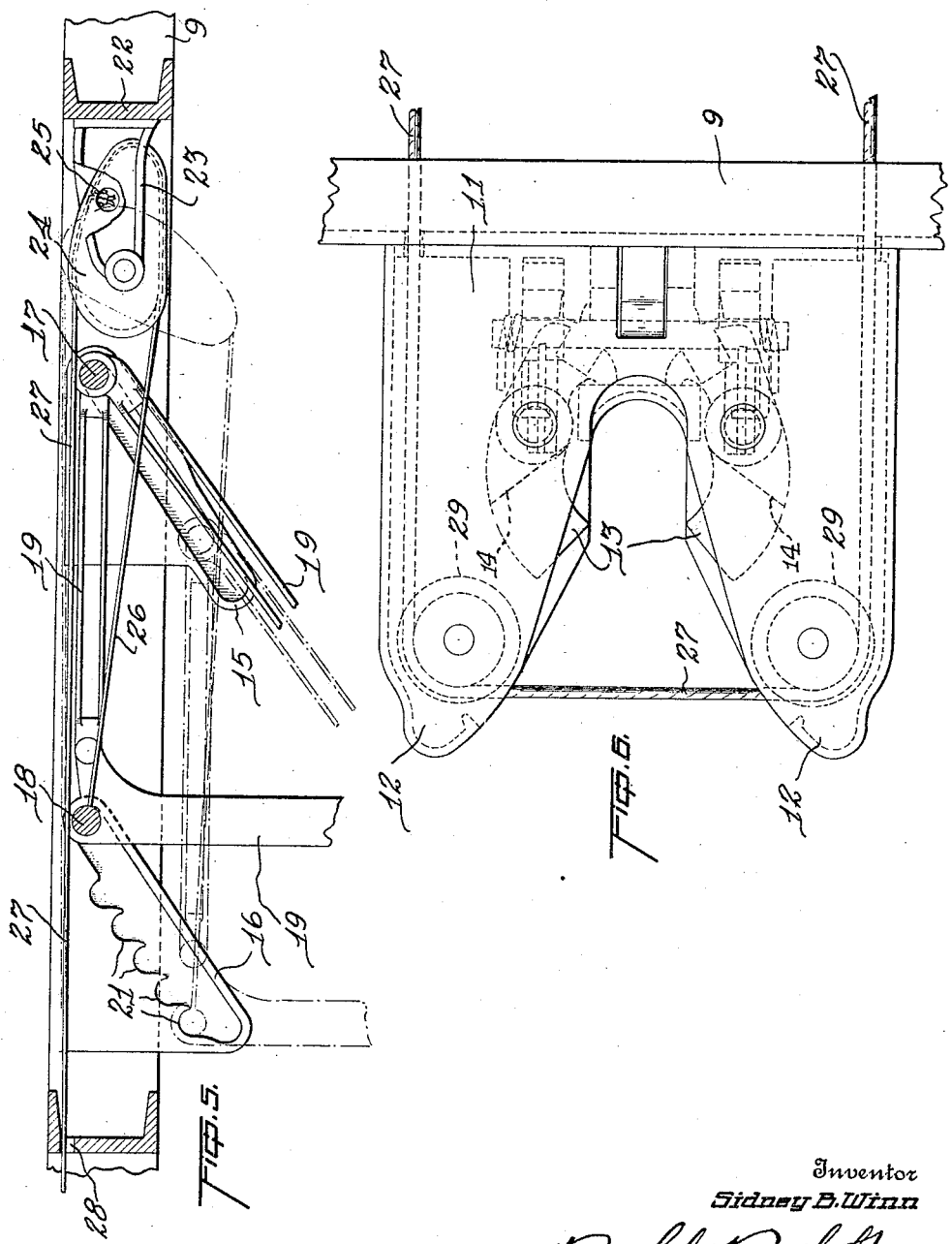
Inventor
Sidney B. Winn Patented June 20, 1933

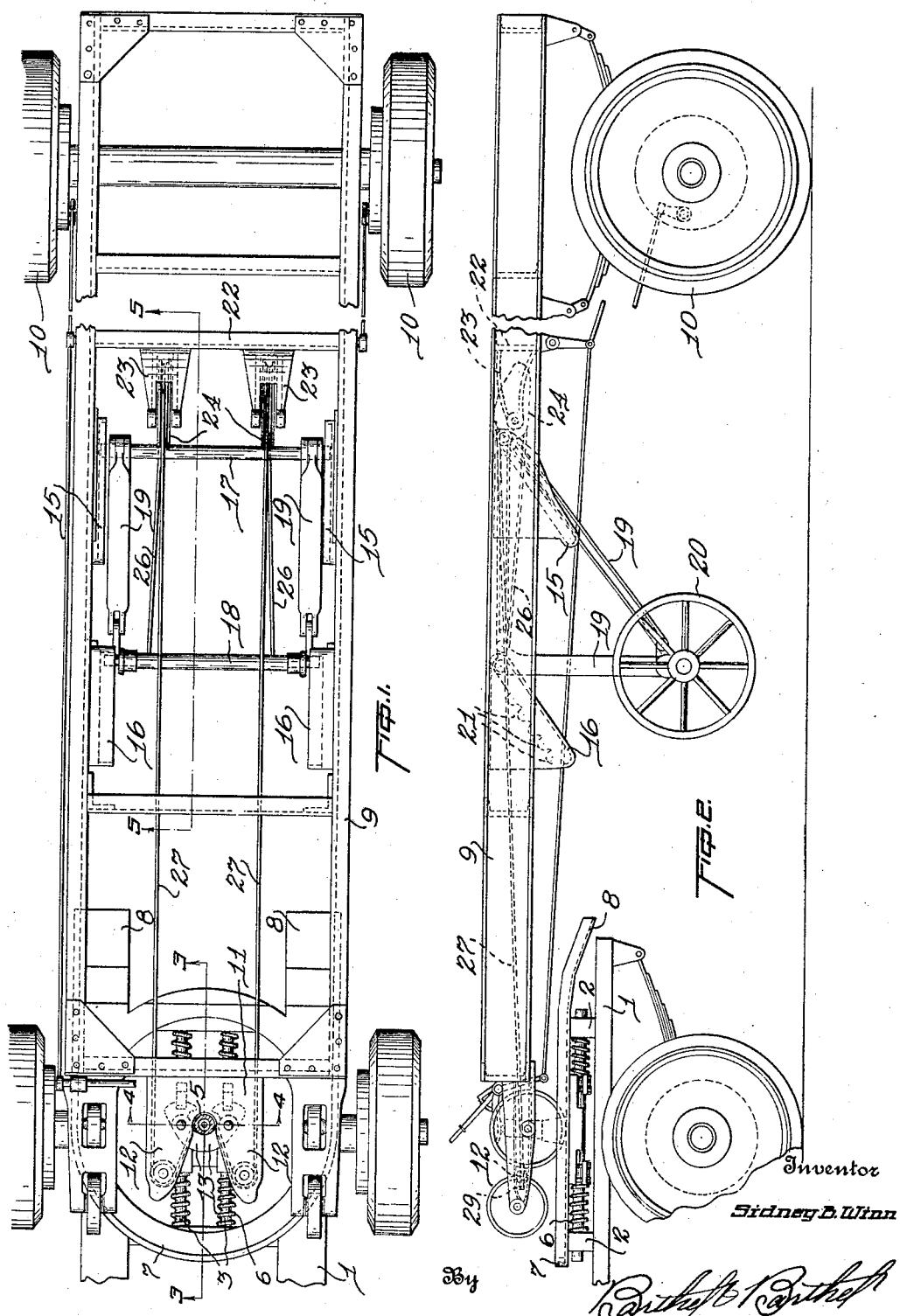

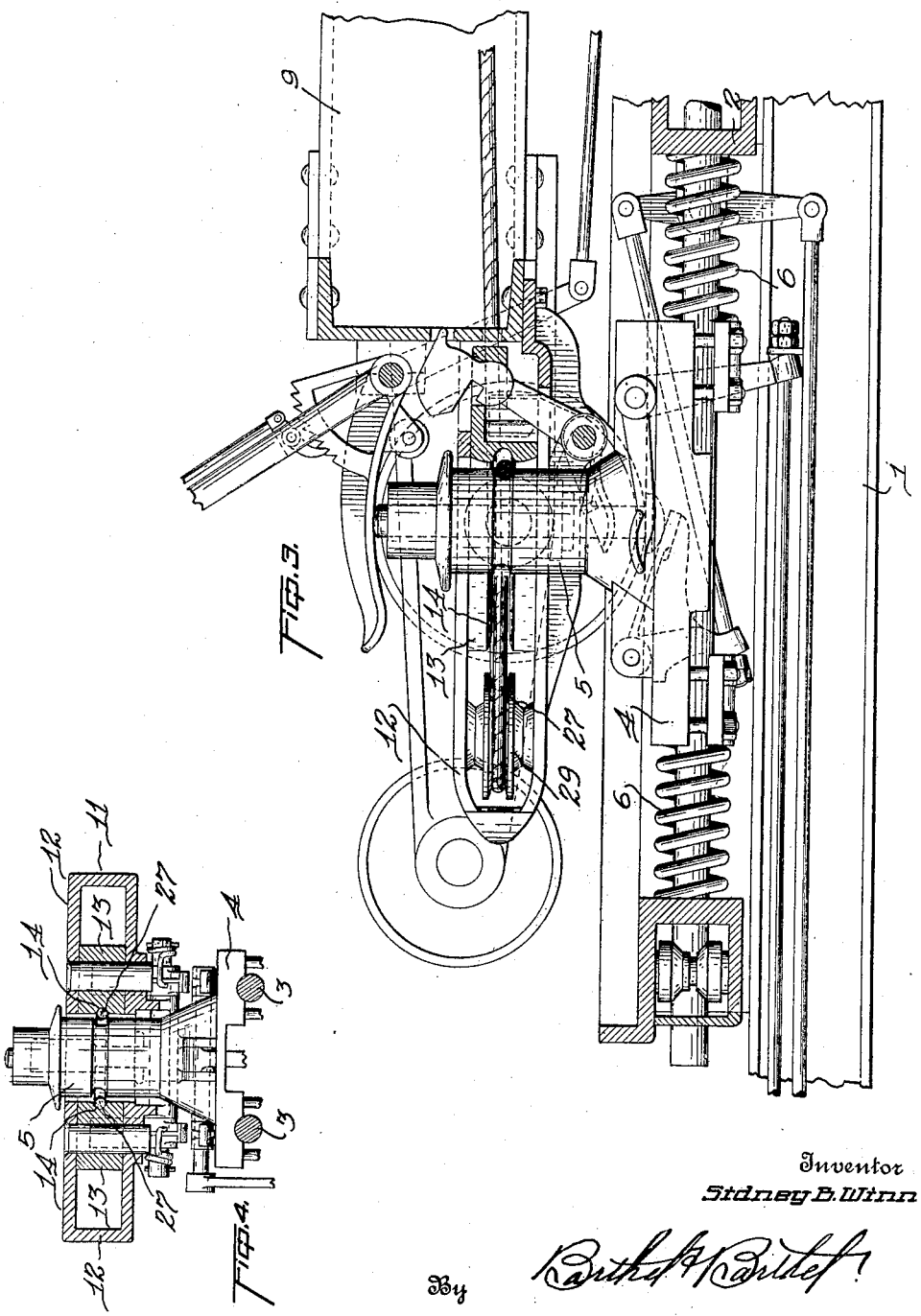

1,915,142

UNITED STATES PATENT OFFICE

SIDNEY B. WINN, OF LAPEER, MICHIGAN

LEG ELEVATING MEANS FOR TRAILERS

Application filed December 22, 1930. Serial No. 503,998.

The present invention pertains to a novel leg elevating means for use in tractor and trailer combinations wherein the tractor and trailer are coupled together for combined service and disengageable by uncoupling for independent service, being particularly adapted for use in such combinations wherein the coupling and uncoupling operations are accomplished by relative movement of the tractor in the direction of traction and wherein a shiftable leg structure on the trailer supports the latter and provides for trailer service independent of the tractor. The tractor to which the present leg elevating means is applicable includes, among other things, an inclined track leading to a turntable which serves as a member affording a fifth wheel action between the tractor and the trailer while the trailer includes, among other things, a chassis having its rear end supported by a rear axle assembly including the usual wheels and brake mechanism. The forward end of the trailer chassis is supported by wheels upon the turntable of the tractor and such relation is established by backing the rear end of the tractor under the forward end of the trailer. The forward end of the trailer is also provided with a leg structure that may be raised when the tractor and trailer are coupled and lowered when they are uncoupled to support the trailer independent of the tractor.

The present invention has, therefore, as its primary object to provide positive and reliable means operated simultaneous with and by the tractor as it backs into engagement with the trailer during the coupling operation so that the initial engagement of the tractor with the trailer causes the forward end of the trailer to rest upon the turntable and as they come into coupled relation the leg which otherwise remains extended for supporting the forward end of the trailer is elevated. The leg remains in the elevated position while the tractor and trailer are coupled and the initial uncoupling movement releases the leg elevating means and permits the leg to fall by gravity to its extended position.

With the above and other ends in view the invention consists in the matters hereinafter set forth and more particularly pointed out in the appended claims, reference being had to the accompanying drawings, in which Figure 1 is a top plan view of a trailer equipped with the present leg elevating means and coupled to a tractor, a fragment of the latter being shown;

Fig. 2 is a side elevation of the trailer and tractor;

Fig. 3 is an enlarged cross sectional detail view, taken substantially on the line 3—3 of Fig. 1;

Fig. 4 is a transverse cross sectional view taken on the line 4—4 of Fig. 1;

Fig. 5 is a fragmentary cross sectional view taken on the line 5—5 of Fig. 1, being illustrative of the leg supporting member, and Fig. 6 is an enlarged fragmentary plan view, illustrating the coupling jaw.

Like characters of reference are employed throughout to designate the corresponding parts.

The numeral 1 indicates a tractor chassis having cross members 2 secured thereon to support the rods 3 upon which is mounted a plate 4 carrying the king pin 5, springs 6 being interposed between the plate 4 and the cross members 2 to absorb the shock when the king pin comes in contact with the trailer during the coupling operation. A turntable 7 is also mounted upon the chassis of the tractor and is provided with tracks 8 inclined downwardly therefrom.

The numeral 9 indicates the chassis or frame of the trailer which has rear wheels 10 secured thereto in the usual or conventional manner. Mounted on the forward end of the trailer is a bracket 11 formed with coupling jaws 12 which receive the king pin 5 when the tractor and trailer come together. The bracket 11 is hollow and pivotally mounted therein are the fingers 13 which surround the king pin and prevent its removal from between the jaws 12, each of the jaws 13 being recessed at 14 for a purpose which will become apparent as the description progresses.

The trailer chassis 9 is provided with sets of angularly disposed guideways 15 and 16 and movable in these guides are the outer projecting ends of transversely disposed axles 17 and 18 which join the triangular side frames 19. The side frames 19 support the wheels 20 which engage the ground and co-operate with the rear wheels 10 in providing a trailer which is self supporting when disconnected from the tractor to permit its use independently. The guides 16 are provided with recesses 21 in the upper wall thereof and upward pressure on the wheels 20 causes the ends of the axle 18 to move into one of these recesses and prevents sliding movement thereof in the guide. When the weight of the trailer is resting on the wheels 20 the tendency is for the wheels to force the frames 19 upwardly and in so doing it forces the ends of the axle 18 into one set of the recesses 21 and therefore the wheels 20 and frame 19 cannot move while the weight of the trailer rests thereon.

The chassis of the trailer is provided in the usual manner with several cross members and the cross member designated by the numeral 22 supports a pair of brackets 23. The brackets 23 rotatably support substantially egg-shaped sheaves 24 to which are connected, as at 25, a pair of flexible cables 26 having their opposite ends connected to the axle 18. Another cable 27 is also connected to the sheaves 24 at the point 25 and passes through openings 28 in the trailer chassis cross members and is looped around rollers 29 supported in the outer ends of the coupling jaws 12 to extend across the space between the same.

In describing the operation of the present device it will be assumed that the tractor is being backed into engagement with the trailer. As the tracks 2 come under the forward end of the trailer the latter is raised from the ground. This permits the ends of axle 18 to drop from the recesses 21 and rest on the smooth lower wall of the guides 16 where they are free to slide. As the king pin 5 enters between the jaws 12 it comes in contact with the cable 27 and forces the latter backwardly into the recesses 14 in the fingers 13 and by forcing the cable backwardly at this point it draws on the sheaves 24 and causes partial rotation thereof. The partial rotation of the sheaves 24 causes the cables 26 to be wound thereon in a manner drawing the axle 18 towards the rear end of the trailer, the backward movement causing the frames 19 to be raised as a result of the mounting of the axles 17 and 18 in the inclined brackets 15 and 16.

In uncoupling the tractor from the trailer the king pin upon leaving the jaws 12 permits the cable 27 to come forward at this point, permitting the sheaves 24 to rotate in the reverse direction and permit the axles 17 and 18 and frames 19 to slide downwardly by force of gravity. When the axles rest in the bottom of the guides upward pressure on the wheels causes upward movement of the axle 18 until it is received in one of the recesses 21.

The members 26 and 27 have been described as cables but it is obvious that any other flexible members, such as chains for instance, could readily be substituted therefor and although a specific embodiment of the invention has been described in detail it is to be understood that various other changes may be made in the details of construction without departing from the spirit of the invention, and such changes as may be made within the scope of the appended claims are contemplated.

What I claim is:—

1. The combination with a tractor having a king pin and a trailer having coupling jaws for surrounding said king pin, of a shiftable wheel support on said trailer, and flexible members connected to said wheel support and trained across the forward ends of said jaws whereby it is engaged by said king pin as it enters said jaws.

2. The combination with a tractor having a coupling pin and a trailer, of inclined guide brackets mounted upon said trailer, wheel supporting frames received in said brackets, cam elements rotatably mounted on said trailer, and a flexible member arranged to be engaged by said tractor coupling pin as it is coupled to the trailer to rotate said cam elements and elevate the wheel supporting frames.

3. The combination with a tractor having a king pin and a trailer having a pair of jaws, of inclined guide brackets mounted upon said trailer, wheel supporting frames received in said brackets, cam elements rotatably mounted on said trailer, and a flexible member extending across said jaws and connected to the cam elements and frames whereby the king pin entering said jaws causes said cable to partially rotate said sheaves.

4. The combination with a tractor having a king pin and a trailer having a pair of jaws, of inclined guide brackets mounted upon said trailer, wheel supporting frames received in said brackets, cam elements rotatably mounted on said trailer, rollers mounted in the forward ends of said jaws, and a cable trained over said rollers and connected to said sheaves whereby the king pin entering said jaws is operative to place the cable under tension and raise the wheel supporting frames in the brackets.

5. The combination with a tractor having a coupling pin and a trailer, of a retractable leg for the trailer, cam elements mounted on said trailer and a flexible element connected with the leg and cam elements and arranged to be engaged directly by the coupling pin to rotate said cam and retract the leg incident to the coupling of the tractor and trailer.

6. The combination with a tractor having a coupling embodying a king pin and a trailer having coupling jaws to receive said king pin, cam elements rotatably mounted on said trailer, a wheel support mounted on said trailer and arranged for movement towards and away from the ground, and a flexible member connected to said cam elements and wheel support and having a portion disposed in the path of the king pin whereby it is tensioned by movement of said king pin entering said jaws.

In testimony whereof I affix my signature.

SIDNEY B. WINN.